(12) United States Patent
Hasegawa

(10) Patent No.: US 11,089,213 B2
(45) Date of Patent: Aug. 10, 2021

(54) INFORMATION MANAGEMENT APPARATUS AND INFORMATION MANAGEMENT METHOD, AND VIDEO REPRODUCTION APPARATUS AND VIDEO REPRODUCTION METHOD

(71) Applicant: Sony Corporation, Tokyo (JP)

(72) Inventor: Yuichi Hasegawa, Tokyo (JP)

(73) Assignee: Sony Group Corporation

( * ) Notice: Subject to any disclaimer, the term of this patent is extended or adjusted under 35 U.S.C. 154(b) by 41 days.

(21) Appl. No.: 15/738,263

(22) PCT Filed: May 13, 2016

(86) PCT No.: PCT/JP2016/064383
§ 371 (c)(1),
(2) Date: Dec. 20, 2017

(87) PCT Pub. No.: WO2017/022296
PCT Pub. Date: Feb. 9, 2017

(65) Prior Publication Data
US 2018/0183999 A1    Jun. 28, 2018

(30) Foreign Application Priority Data

Aug. 3, 2015   (JP) .............................. JP2015-153070

(51) Int. Cl.
*H04N 5/91* (2006.01)
*H04N 5/76* (2006.01)
(Continued)

(52) U.S. Cl.
CPC ......... *H04N 5/23238* (2013.01); *G06F 3/012* (2013.01); *G06T 1/00* (2013.01);
(Continued)

(58) Field of Classification Search
None
See application file for complete search history.

(56) References Cited

U.S. PATENT DOCUMENTS

| 8,698,875 | B2 | 4/2014 | Anguelov et al. | |
| 2009/0237490 | A1* | 9/2009 | Nelson, Jr. | ........... H04N 5/2252 |
| | | | | 348/43 |

(Continued)

FOREIGN PATENT DOCUMENTS

| JP | 2010224715 | * 10/2010 |
| JP | 2010224715 A | 10/2010 |

(Continued)

OTHER PUBLICATIONS

International Search Report from PCT/JP2016/064383, dated Jun. 21, 2016 (3 pgs.).

*Primary Examiner* — Christopher Braniff
(74) *Attorney, Agent, or Firm* — Lerner, David, Littenberg, Krumholz & Mentlik, LLP

(57) ABSTRACT

Reproduction position information of a free viewpoint video is formatted to be easy for a viewer to understand, and managed.

Words of a photographer, the words being uttered when the photographer was impressed at a time of shooting a scenery of the real world, are used as a tag of the shot video, and the words are managed in association with a viewpoint position and a viewing direction, and shooting time. Alternatively, words of the viewer viewing the free viewpoint video, the words being uttered when the viewer was impressed by a certain scene, are used as a tag of the shot video, and the words are managed in association with a viewpoint position and a viewing direction, and shooting time corresponding to the reproduction position. The viewer can cue a desired free (Continued)

viewpoint video by using a tag with which tagging has been performed by the viewer himself/herself or another person.

16 Claims, 17 Drawing Sheets

(51) Int. Cl.
*H04N 7/18* (2006.01)
*H04N 5/247* (2006.01)
*H04N 5/232* (2006.01)
*G06T 1/00* (2006.01)
*G11B 27/32* (2006.01)
*G06F 3/01* (2006.01)
*G11B 27/34* (2006.01)
*G10L 15/26* (2006.01)
*G06T 11/60* (2006.01)

(52) U.S. Cl.
CPC ............ *G11B 27/322* (2013.01); *G11B 27/34* (2013.01); *H04N 5/232* (2013.01); *H04N 5/23219* (2013.01); *H04N 5/247* (2013.01); *H04N 5/76* (2013.01); *H04N 5/91* (2013.01); *H04N 7/181* (2013.01); *G06T 11/60* (2013.01); *G10L 15/26* (2013.01)

(56) References Cited

U.S. PATENT DOCUMENTS

| | | | |
|---|---|---|---|
| 2013/0101017 A1* | 4/2013 | De Vleeschauwer | A63F 13/12 375/240.02 |
| 2015/0293362 A1* | 10/2015 | Takahashi | G02B 27/02 348/47 |

FOREIGN PATENT DOCUMENTS

| | | | |
|---|---|---|---|
| JP | 4774940 B2 | | 9/2011 |
| JP | 2013183209 A | | 9/2013 |
| JP | 2014071870 A | | 4/2014 |
| JP | 2014120109 | * | 6/2014 |
| JP | 2014120109 A | | 6/2014 |
| JP | 2014215828 | * | 11/2014 |
| JP | 2014215828 A | | 11/2014 |
| WO | 2014077046 A1 | | 5/2014 |

* cited by examiner

FIG. 11

| TAG (TEXTUAL INFORMATION) | REPRODUCTION POSITION INFORMATION | | |
|---|---|---|---|
| | VIEWPOINT POSITION | VIEWING DIRECTION | SHOOTING TIME |
| ACHIEVEMENT OF GREAT ADVENTURE OF 20XX | | | |
| FAILURE OF TARO ON NEW YEAR'S EVE | | | |
| ⋮ | ⋮ | ⋮ | ⋮ |

FIG. 13

| TAG (TEXTUAL INFORMATION) | REPRODUCTION POSITION INFORMATION | SHOOTING CONDITIONS |
|---|---|---|
| ACHIEVEMENT OF GREAT ADVENTURE OF 20XX | | |
| FAILURE OF TARO ON NEW YEAR'S EVE | | |
| ⋮ | ⋮ | ⋮ |

FIG. 16

| TAG (TEXTUAL INFORMATION) | REPRODUCTION POSITION INFORMATION | USER INFORMATION |
|---|---|---|
| ACHIEVEMENT OF GREAT ADVENTURE OF 20XX | | |
| FAILURE OF TARO ON NEW YEAR'S EVE | | |
| ⋮ | ⋮ | ⋮ |

INFORMATION MANAGEMENT APPARATUS AND INFORMATION MANAGEMENT METHOD, AND VIDEO REPRODUCTION APPARATUS AND VIDEO REPRODUCTION METHOD

CROSS-REFERENCE TO RELATED APPLICATIONS

This application is a national phase entry under 35 U.S.C. § 371 of International Application No. PCT/JP2016/064383 filed May 13, 2016, which claims the priority from Japanese Patent Application No. 2015-153070, filed in the Japanese Patent Office on Aug. 3, 2015, the entire contents of which are hereby incorporated by reference.

TECHNICAL FIELD

Technology disclosed in the present description relates to an information management apparatus and an information management method for managing information regarding a free viewpoint video, and to a video reproduction apparatus and a video reproduction method for reproducing a free viewpoint video.

BACKGROUND ART

Research and development of free viewpoint video technology which allows a viewer to freely select a viewpoint position and a viewing direction has been proceeding. For example, entertainment videos such as sports and concert broadcasts, intangible cultural properties, educational content and the like can be exemplified as main application fields of the free viewpoint video technology. Recently, the free viewpoint video technology has begun to be applied to services which virtually search a real space, as represented by "Street View (registered trademark)" provided by Google Inc. on the Internet. Furthermore, even in a private event such as a wedding reception, it is conceivable to view such an event from various viewpoints by applying the free viewpoint video technology using videos shot by multiple cameras mounted in a reception hall.

Free viewpoint videos are generated on the basis of videos with multiple viewpoints including different viewpoint positions and viewing directions. In order to obtain highly realistic feeling, free viewpoint videos are produced using live-action videos obtained by shooting the real world with cameras. In addition, in order to obtain a high-quality free viewpoint video, it is necessary to shoot a scene with a close camera interval, but in reality the number of cameras is finite, and the camera interval also has limitation of the size of the device. Therefore, it is common to generate, by using viewpoint video interpolation technology, a video with a viewpoint position and a viewing direction not shot by a camera.

For example, a video composing apparatus has been proposed. When composing a video with virtual viewpoints, the video composing apparatus detects points corresponding to each other between multi-viewpoint videos, then selects only points of which correspondence thus detected is reliable, and interpolates other points with a patch which includes points obtained by projecting the points included in the reliable correspondence onto a composite video, thereby composing a video with arbitrarily set virtual viewpoints (see, for example, Patent Document 1).

In addition, a video processing method has been proposed in which multiple cameras are mounted on a vehicle so that a shooting range of each camera overlaps that of a neighboring camera, and photographs are stitched together while removing overlapped portions, thereby generating a continuous 360-degree panoramic video (see, for example, Patent Document 2).

In a case of viewing a free viewpoint video, it is necessary to specify reproduction position information such as desired viewpoint positions and viewing directions. In addition, in a case where a free viewpoint video is provided for each point of time, it is necessary to specify information of time in addition to the viewpoint positions and the viewing directions in order to view a desired video. However, the viewpoint positions, the viewing directions, and the time which specify the time and space in the free viewpoint videos are basically only numeric data, and are pieces of information difficult for a viewer to memorize, and it is difficult for the viewer to remember the content of the video even if numerical values are presented. That is, these are pieces of information difficult to be familiar with.

For example, a video data reproduction apparatus has been proposed which employs, as individual viewpoint information, time information, screen information, camera information, and attribute information, and as viewpoint selection information, one piece of individual viewpoint information arbitrarily specified by a user among a plurality of pieces of individual viewpoint information, and generates a viewpoint video using video data specified by the viewpoint selection information (see, for example, Patent Document 3).

In addition, in Street View (registered trademark) described above, a user interface is provided which allows an icon called "Pegman" to be dropped and dragged on a map to specify a location desired to be displayed. Users easily feel familiar with such an operation method, which is nothing else that the viewpoint position is directly specified.

In addition, there has been a proposal for a multi-viewpoint video stream viewing system which provides a user viewing interface including a video viewing window, a video operation pict button, a zoom magnification adjustment bar, a camera viewpoint selection list, and a target point selection list (see, for example, Patent Document 4). In the video viewing window, a video stream with a viewpoint selected by a viewer from the camera viewpoint selection list is always displayed. In addition, if another viewpoint is selected from the camera viewpoint selection list, the video stream is switched to a video stream with another viewpoint. When selecting one nailing point (peg point) attached to a target desired to be focused on from the target point selection list, a display position is controlled within the window of the stream video so that the target (person) is always displayed in the center of a screen, for example.

In addition, there is known technology with which chapter information is embedded in motion video content recorded on a recording medium such as a hard disk drive (HDD) or a digital versatile disc (DVD), and a desired scene is searched for and reproduced on a chapter basis (see, for example, Patent Document 5). However, regarding the chapter information, only a reproduction position on a time axis in a motion video stream can be specified, and a viewpoint position and a viewing direction cannot be specified.

CITATION LIST

Patent Document

Patent Document 1: Japanese Patent Application Laid-Open No. 2014-71870
Patent Document 2: U.S. Pat. No. 8,698,875
Patent Document 3: Japanese Patent Application Laid-Open No. 2014-215828
Patent Document 4: Japanese Patent Application Laid-Open No. 2013-183209
Patent Document 5: Japanese Patent No. 4774940

SUMMARY OF THE INVENTION

Problems to be Solved by the Invention

An object of technology disclosed in the present description is to provide an information management apparatus and an information management method which are excellent and capable of suitably managing reproduction position information of a free viewpoint video.

A further object of the technology disclosed in the present description is to provide a video reproduction apparatus and a video reproduction method which are excellent and capable of specifying reproduction position information of a free viewpoint video and suitably reproducing the free viewpoint video.

Solutions to Problems

The technology disclosed in the present description is made in consideration of the above-described problems, and a first aspect thereof is:

an information management apparatus which includes:

a reproduction position specifying unit which specifies a reproduction position of a free viewpoint video including at least a viewpoint position and a viewing direction, and time information;

a tag input unit which inputs a tag including textual information with respect to the specified reproduction position; and a tag management unit which manages the input tag in association with the specified reproduction position.

According to a second aspect of the technology disclosed in the present description, the reproduction position specifying unit of the information management apparatus according to the first aspect is configured to specify the reproduction position of the free viewpoint video on the basis of a viewpoint position and a viewing direction of a camera which shoots the free viewpoint video and shooting time.

According to a third aspect of the technology disclosed in the present description, the reproduction position specifying unit of the information management apparatus according to the first aspect is configured to specify a reproduction position at a time the tag is input from the tag input unit while the free viewpoint video is being viewed.

According to a fourth aspect of the technology disclosed in the present description, the information management apparatus according to the first aspect further includes a head movement tracking unit which tracks movement of the head of a viewer and a display unit which displays the free viewpoint video while changing the viewpoint position and the viewing direction depending on a detection result by the head movement tracking unit. Then, the reproduction position specifying unit is configured to specify a reproduction position based on a detection result by the head movement tracking unit at a time the tag is input from the tag input unit while the free viewpoint video is being viewed.

According to a fifth aspect of the technology disclosed in the present description, the tag input unit of the information management apparatus according to the first aspect is configured to input the tag including textual information based on an input operation by a photographer or a viewer of the free viewpoint video.

According to a sixth aspect of the technology disclosed in the present description, the tag input unit of the information management apparatus according to the first aspect is configured to input the tag including textual information based on a recognition result of a speech input from a photographer or a viewer of the free viewpoint video.

According to a seventh aspect of the technology disclosed in the present description, the tag management unit of the information management apparatus according to the first aspect is configured to manage the tag in further association with shooting conditions for shooting the free viewpoint video.

According to an eighth aspect of the technology disclosed in the present description, the tag management unit of the information management apparatus according to the first aspect is configured to manage the tag in further association with user information regarding a photographer or a viewer of the free viewpoint video.

In addition, a ninth aspect of the technology disclosed in the present description is an information management method including:

a reproduction position specifying step of specifying a reproduction position of a free viewpoint video including at least a viewpoint position and a viewing direction, and time information;

a tag input step of inputting a tag including textual information with respect to the specified reproduction position; and a tag management step of managing the input tag in association with the specified reproduction position.

In addition, a tenth aspect of the technology disclosed in the present description is a video reproduction apparatus including:

a tag management unit which manages tags including textual information each associated with a reproduction position of a free viewpoint video including at least a viewpoint position and a viewing direction, and time information;

a tag display unit which displays the tags managed by the tag management unit;

a reproduction position specifying unit which specifies a reproduction position corresponding to a tag selected through the tag display unit; and an output unit which reproduces and outputs the free viewpoint video from the reproduction position specified by the reproduction position specifying unit.

According to an eleventh aspect of the technology disclosed in the present description, the tag display unit of the video reproduction apparatus according to the tenth aspect is configured to display the tag arranged on the basis of the time information associated therewith.

According to a twelfth aspect of the technology disclosed in the present description, the tag display unit of the video reproduction apparatus according to the tenth aspect includes a see-through type screen, and to display the tag as virtual information on a scenery of the real world in a superimposed manner.

According to a thirteenth aspect of the technology disclosed in the present description, the tag display unit of the video reproduction apparatus according to the twelfth aspect is configured to display the tag on the scenery of the real world in a superimposed manner on the basis of the viewpoint position or the viewing direction associated therewith.

According to a fourteenth aspect of the technology disclosed in the present description, the video reproduction apparatus according to the tenth aspect further includes an additional information holding unit which holds additional information. Then, the output unit is configured to reproduce and output the free viewpoint video in consideration of the additional information.

According to a fifteenth aspect of the technology disclosed in the present description, the additional information holding unit of the video reproduction apparatus according to the fourteenth aspect is configured to hold user information regarding a viewer of the free viewpoint video as the additional information, and the output unit is configured to reproduce and output the free viewpoint video in consideration of the user information.

In addition, a sixteenth aspect of the technology disclosed in the present description is a video reproduction method including:

a tag management step of managing, by a tag management unit, tags including textual information each associated with a reproduction position of a free viewpoint video including at least a viewpoint position and a viewing direction, and time information;

a tag display step of displaying the tags managed by the tag management unit on a tag display unit;

a reproduction position specifying step of specifying a reproduction position corresponding to a tag selected through the tag display unit; and an output step of reproducing and outputting the free viewpoint video from the reproduction position specified in the reproduction position specifying step.

Effects of the Invention

According to the technology disclosed in the present description, it is possible to provide an information management apparatus and information management method which are excellent and capable of formatting reproduction position information of a free viewpoint video to be easy for a viewer to understand and managing the reproduction position information.

In addition, according to the technology disclosed in the present description, it is possible to provide a video reproduction apparatus and a video reproduction method which are excellent and capable of specifying reproduction position information in a format easy for the viewer to understand and reproducing a free viewpoint video.

Note that the effects described in the present description are merely examples, and the effects of the present invention are not limited thereto. In addition, besides the above effects, the present invention may further exert additional effects.

Still other objects, features and advantages of the technology disclosed in the present description will become apparent from a more detailed description based on embodiments to be described later and accompanying drawings.

BRIEF DESCRIPTION OF DRAWINGS

FIG. 11 is a diagram exemplifying a data structure for managing tags.

FIG. 13 is a diagram exemplifying a data structure for managing tags in association with the shooting conditions.

FIG. 16 is a diagram exemplifying a data structure for managing tags in association with the user information.

MODE FOR CARRYING OUT THE INVENTION

Hereinafter, embodiments of the technology disclosed in the present description will be described in detail with reference to the drawings.

Figure 1:
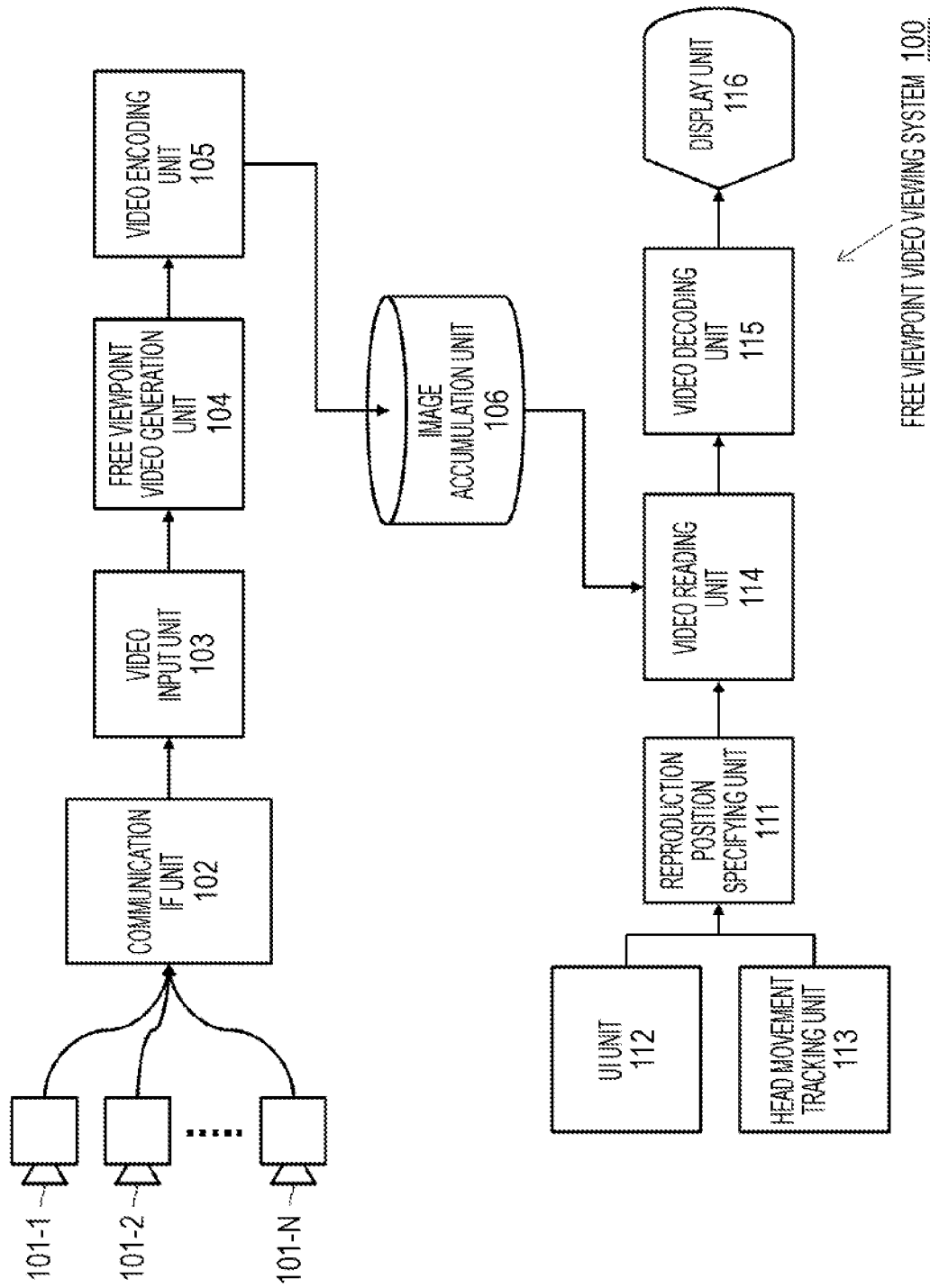
FIG. 1 is a diagram schematically illustrating a configuration example of a free viewpoint video viewing system 100.

FIG. 1 schematically illustrates a configuration example of a free viewpoint video viewing system 100. The illustrated free viewpoint video viewing system 100 generates a free viewpoint video by viewpoint video interpolation technology on the basis of multi-viewpoint videos acquired from a large number (N number) of cameras 101-1, 101-2, . . . , and 101-N which shoot the real world, and in addition, displays and outputs a video shot from a viewpoint position and a viewing direction desired by a viewer.

Each of the cameras 101-1, 101-2, . . . , and 101-N may be a camera mounted on a moving object such as a vehicle or a flying object (including an unmanned aerial vehicle which can be remotely controlled), or a private digital camera carried by a user (including a multi-function information terminal such as a mobile phone, or a smartphone), in addition to a fixed-point camera. Alternatively, at least some of the cameras 101-1, 101-2, . . . , and 101-N may be cameras each attached to a head-mounted display to shoot surroundings of a wearer.

A video input unit 103 inputs videos respectively shot by the cameras 101-1, 101-2, . . . , and 101-N mounted at remote locations via a communication interface (IF) unit 102 together with shooting position information such as viewpoint positions and viewing directions, and shooting time. Then, a free viewpoint video generation unit 104 performs viewpoint interpolation for the videos respectively shot by the cameras 101-1, 101-2, . . . , and 101-N with the viewpoint video interpolation technology while synchronizing the shooting time to generate a free viewpoint video. However, the technology disclosed in the present description is not limited to specific viewpoint video interpolation technology.

A video encoding unit 105 encodes and compresses the free viewpoint video generated by the free viewpoint video generation unit 104 and accumulates the free viewpoint video in a video accumulation unit 106. The video accumulation unit 106 is constituted by a mass storage device such as a hard disk, for example.

A reproduction position specifying unit 111 specifies a reproduction position, specifically a viewpoint position and a viewing direction, and further, shooting time of a free viewpoint video viewed by the viewer. The reproduction position specifying unit 111 specifies reproduction position information, for example, through an operation of the viewer or speech input of the viewer to a user interface (UI) unit 112. Alternatively, the reproduction position specifying unit 111 specifies a viewpoint position and a viewing direction of a video to be reproduced on the basis of a detection result of a head movement tracking unit 112 which tracks a position and a posture of the viewer's head.

A video reading unit 114 reads a free viewpoint video corresponding to the viewpoint position and the viewing direction, and the time specified by the reproduction position specifying unit 111 from the video accumulation unit 106. A video decoding unit 115 decodes the compressed video read from the video accumulation unit 106, and a video display unit 116 displays and outputs the decoded video.

Figure 2:
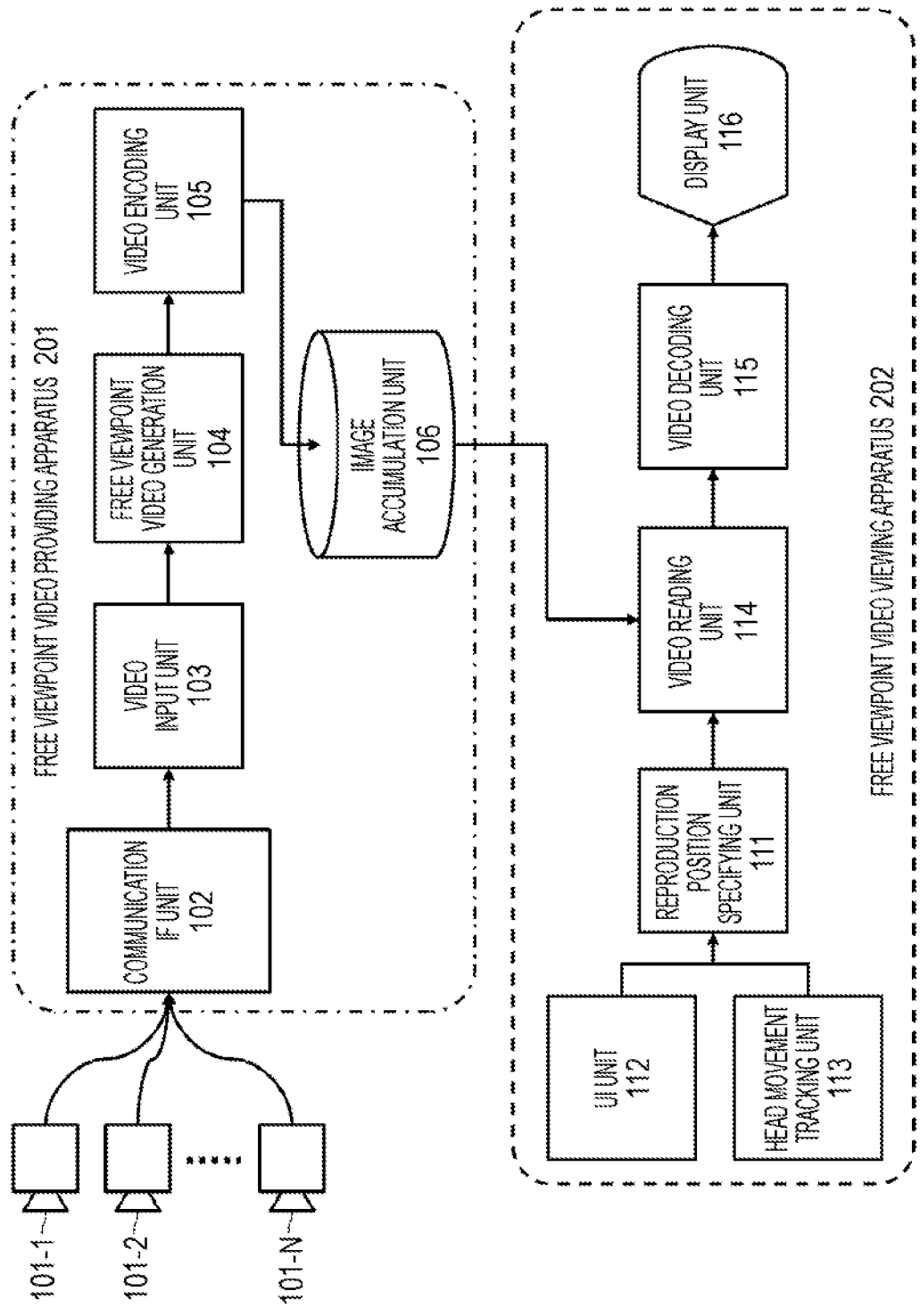
FIG. 2 is a diagram schematically illustrating a configuration example of the free viewpoint video viewing system 100.
Figure 3:
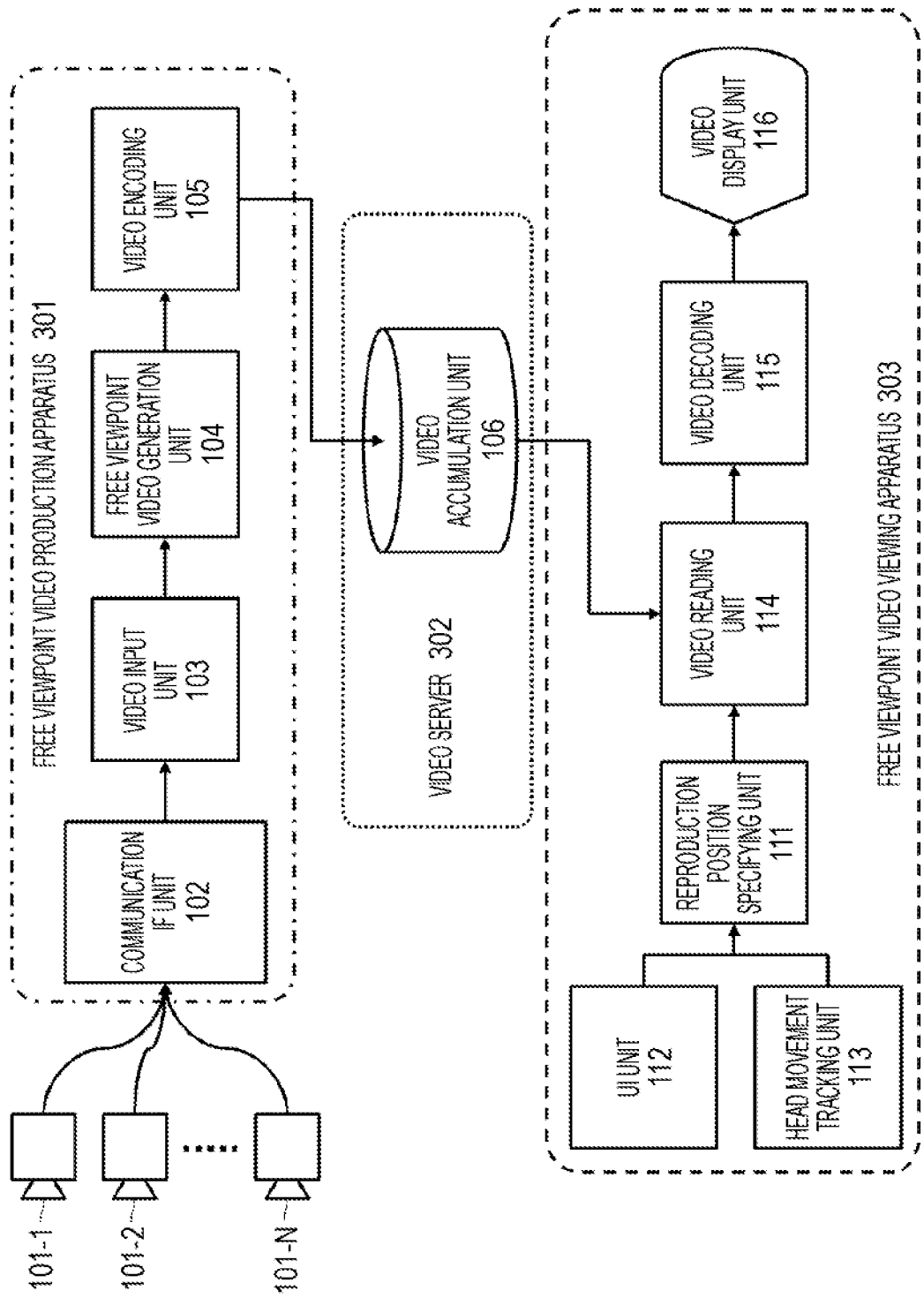
FIG. 3 is a diagram schematically illustrating a configuration example of the free viewpoint video viewing system 100.

Note that regarding the free viewpoint video viewing system 100, besides a case where the free viewpoint video viewing system 100 is configured as a single apparatus, the following cases are conceivable; a case where the free viewpoint video viewing system 100 is configured as a combination of two apparatuses, i.e. a free viewpoint video providing apparatus 201 and a free viewpoint video viewing apparatus 202 as illustrated in FIG. 2, and a case where the free viewpoint video viewing system 100 is configured as a combination of three apparatuses, i.e. a free viewpoint video production apparatus 301, a video server 302, and a free viewpoint video viewing apparatus 303 as illustrated in FIG. 3. The free viewpoint video viewing apparatus 202 or 303 may be a display monitor such as a TV receiver, or a head-mounted display the viewer wears on the head to observe a video.

In order to generate a free viewpoint video desired by the viewer, it is necessary to specify a reproduction position including at least information regarding a viewpoint position and a viewing direction, and time. However, the viewpoint position, the viewing direction, and the time specifying the time and space in the free viewpoint video are basically only numeric data, which are difficult for the viewer to memorize. In addition, it is difficult for the viewer to remember the content of the video even if the reproduction position is presented by the numerical data. That is, it is information difficult for the viewer to be familiar with.

In a case of a normal motion video stream, if a search is performed on a time axis using, for example, fast forward or rewind, it is possible to reach a desired scene even if it takes time and effort. On the other hand, in a case of a free viewpoint video, the reproduction position has seven degrees of freedom in total including, in addition to the time axis, the viewpoint position and the viewing direction. For this reason, even if a photographer or a viewer desires to view again an impressive scene later, it is extremely difficult to reach the scene while changing the viewpoint positions and the viewing directions.

In addition, there is known a method for specifying a place desired to be displayed by dropping and dragging an icon called "Pegman" on a map, but this type of icon simply displays a viewpoint position on the map, and does not express the content of the video observed from the viewpoint position.

Therefore, the present description proposes information management technology for performing management by tagging, with a tag including textual information, information specifying a reproduction position of a free viewpoint video, such as a viewpoint position and a viewing direction, and shooting time.

For example, words of a photographer of the camera 101, the words being uttered when the photographer was impressed at a time of shooting a scenery of the real world, are used as a tag of the shot video, and the words are managed in association with a viewpoint position and a viewing direction, and shooting time in the shooting by the camera 101.

Alternatively, words of a viewer viewing the free viewpoint video, the words being uttered when the viewer was impressed by a certain scene, are used as a tag of the shot video, and the words are managed in association with a viewpoint position and a viewing direction, and shooting time corresponding to the reproduction position.

The viewer or the photographer can input a tag including textual information from an input operation unit such as a keyboard or a touch panel. Alternatively, textual information, which is obtained by inputting a speech emanated by the viewer or the photographer, and performing voice recognition, may be used as a tag.

A tag including textual information is like a name or a title attached to a reproduction position (a viewpoint position and a viewing direction, and shooting time) of a free viewpoint video. It is more preferable for the photographer or the viewer to input words which briefly express features of the reproduction position as a tag, but any words the photographer or the viewer has thought with their own sensitivity or any words which has occurred to the photographer or the viewer on the spot may be used. In either case, the numerical data of the viewpoint position and the viewing direction, and the shooting time are replaced with words, and it is easier for the photographer or the viewer to memorize and be familiar with the words than the numerical data.

When viewing the free viewpoint video later, the photographer himself/herself can reach a scene the photographer was impressed at the time of shooting by using, as a clue, a tag including textual information emanated by the photographer at the time of shooting, instead of specifying numerical data of the viewpoint position and the viewing direction, and the shooting time.

In addition, it is possible for the viewer to cue a moving or interesting scene by using, as a clue, a tag corresponding to the words the viewer uttered when the viewer performed the free viewpoint video in the past.

In addition, other viewers also can find a moving or interesting scene efficiently by using, as a clue, a tag including textual information with which tagging has been performed by another person (the photographer or another viewer), instead of specifying numerical data of the viewpoint position and the viewing direction, and the shooting time at random.

Figure 4:
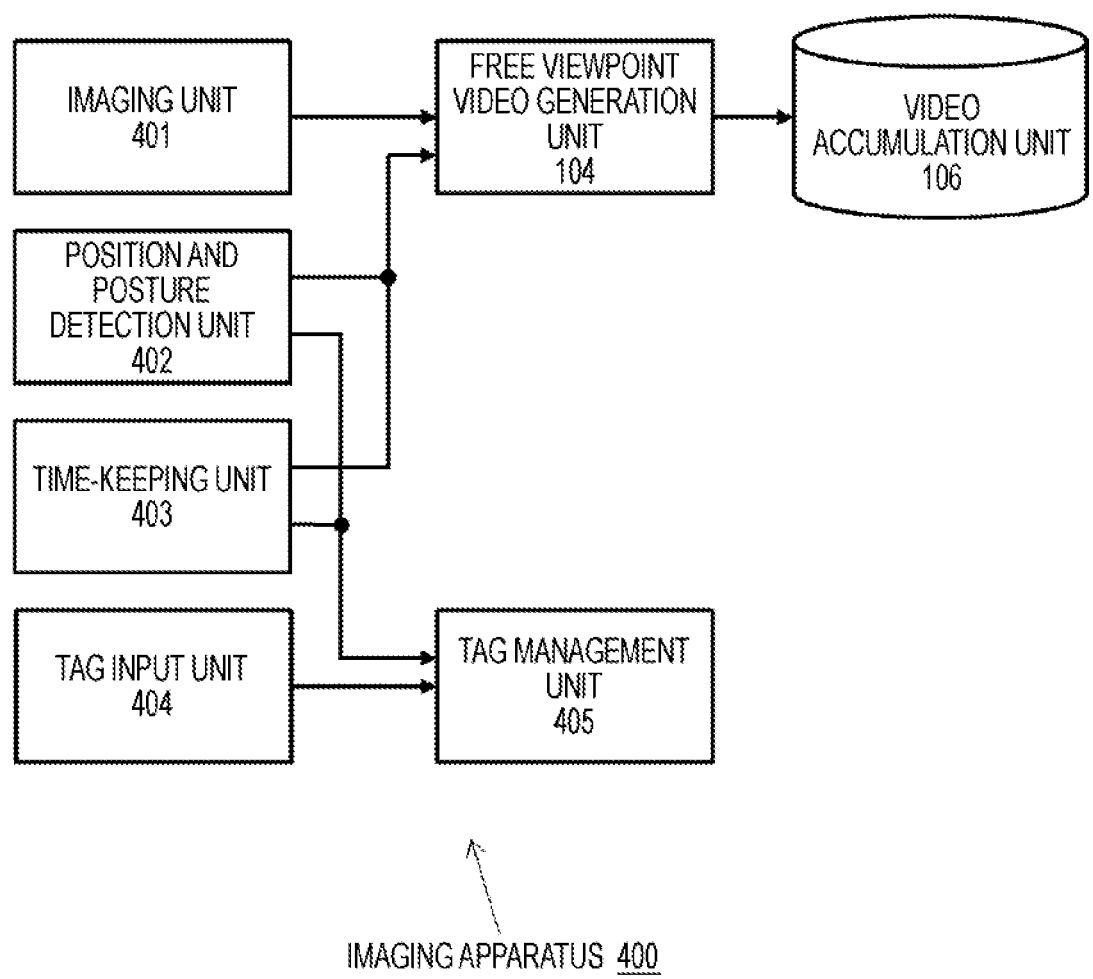
FIG. 4 is a diagram schematically illustrating a functional configuration example of an imaging apparatus 400 having a tagging function.

FIG. 4 schematically illustrates a functional configuration example of an imaging apparatus 400 having a tagging function. The imaging apparatus 400 corresponds to any one of the cameras 101-1, 101-2, ..., and 101-N which sends a shot video to the free viewpoint video viewing system 100. However, it is not necessary for all the cameras 101-1, 101-2, ..., and 101-N to be provided with the tagging function.

An imaging unit 401 includes an image sensor such as a complementary metal oxide semiconductor (CMOS), an optical lens, a signal processing unit which processes sensor signals and the like, and outputs a shot video signal. The video signal is also used as a single-viewpoint video constituting a free viewpoint video. In addition, a free viewpoint video can be constituted by using video signals of one moving camera as viewpoint videos at two or more points on the locus of the camera.

A position and posture detection unit 402 detects viewpoint positions and viewing directions of the imaging unit 401 from moment to moment. In a case where the imaging unit 401 is constituted by a fixed-point camera, a viewpoint position and a viewing direction thereof are constant. However, in a case where the imaging unit 401 is constituted by a camera capable of panning and tilting, a viewing direction thereof varies from moment to moment, and in a case where the imaging unit 401 is constituted by a moving camera, both of a viewpoint position and a viewing direction thereof change from moment to moment. The position and posture detection unit 402 is used to detect a viewing position and a viewing direction desired to be tagged at the time of shooting. That is, the viewpoint position and the viewing direction detected by the position and posture detection unit 402 are recorded as information virtually indicating the viewpoint position and the viewing direction in the three-dimensional space based on a free viewpoint video when viewing the free viewpoint video later. In addition, a time-keeping unit 403 keeps time when the position and posture detection unit 402 detects a position and a posture. The time kept by the time-keeping unit 403 is recorded as information indicating a reproduction position on a time axis when viewing the free viewpoint video later.

The video signal shot by the imaging unit 401 is input to the free viewpoint video generation unit 104 via the communication interface 102, together with the viewpoint position and the viewing direction detected by the position and posture detection unit 402 and the shooting time kept by the time-keeping unit 403. In the free viewpoint video generation unit 104, a viewpoint video interpolation process is performed by also using a video shot by another camera to generate a free viewpoint video. Then, the generated free viewpoint video is compressed and encoded and then accumulated in the video accumulation unit 106 (described above).

A tag input unit 404 is constituted by a device for inputting textual information such as a keyboard. Alternatively, the tag input unit 404 includes a combination of a device for inputting a speech such as a microphone and a speech recognition unit for converting an input audio signal into textual information. The photographer (that is, the user of the imaging apparatus 400) can input textual information from the tag input unit 404 at an arbitrary timing during shooting. For example, textual information obtained by speech recognition of words automatically uttered by the photographer during shooting may be used as a tag.

When inputting, from the position and posture detection unit 402, the viewpoint position and the viewing direction of the imaging unit 401 at the time the textual information is input from the tag input unit 404, and inputting the shooting time from the time-keeping unit 403, a tag management unit 405 records the textual information as a tag corresponding to reproduction position information including the viewpoint position and the viewing direction, and the shooting time.

According to the imaging apparatus 400 illustrated in FIG. 4, tagging can be performed at a time of shooting a video. As a variation thereof, a method for performing tagging when filming a free viewpoint video is also conceivable. With a first method, a position and a posture of each attendee in a private event such as a wedding reception can be recognized by using person recognition technology, and can be used as information of viewpoint positions and viewing directions when performing tagging. In addition, with a second method, it is possible to set, at a place desired to be tagged in the field, a marker indicating a reproduction position thereof and to use the marker as information of the viewpoint position and the viewing direction of the tag. In both methods, a person who performs tagging (the person may be a person who attended the event actually) records the time by another method (for example, by pushing a button for instructing to record time).

In order to record a free viewpoint video in a finite space such as a hall for wedding receptions so that the free viewpoint video can be relived, there are methods in which a large number of cameras are mounted in the hall, in which scanning is constantly performed in the hall with one or more laser sensors, and in which one or more cameras and one or more laser sensors are used. It is possible to recognize a position and a posture of a certain guest at a certain guest seat on the basis of filming information. Then, a marker is set at a position where the bride and bridegroom are best visible at a time of ceremonial tasting of a wedding cake, and the time is recorded. In addition, it is possible to set a marker on another guest seat for a guest who was absent, and thereafter, to relive an experience of attending the event in place of the guest who could not attend the event.

Figure 5:
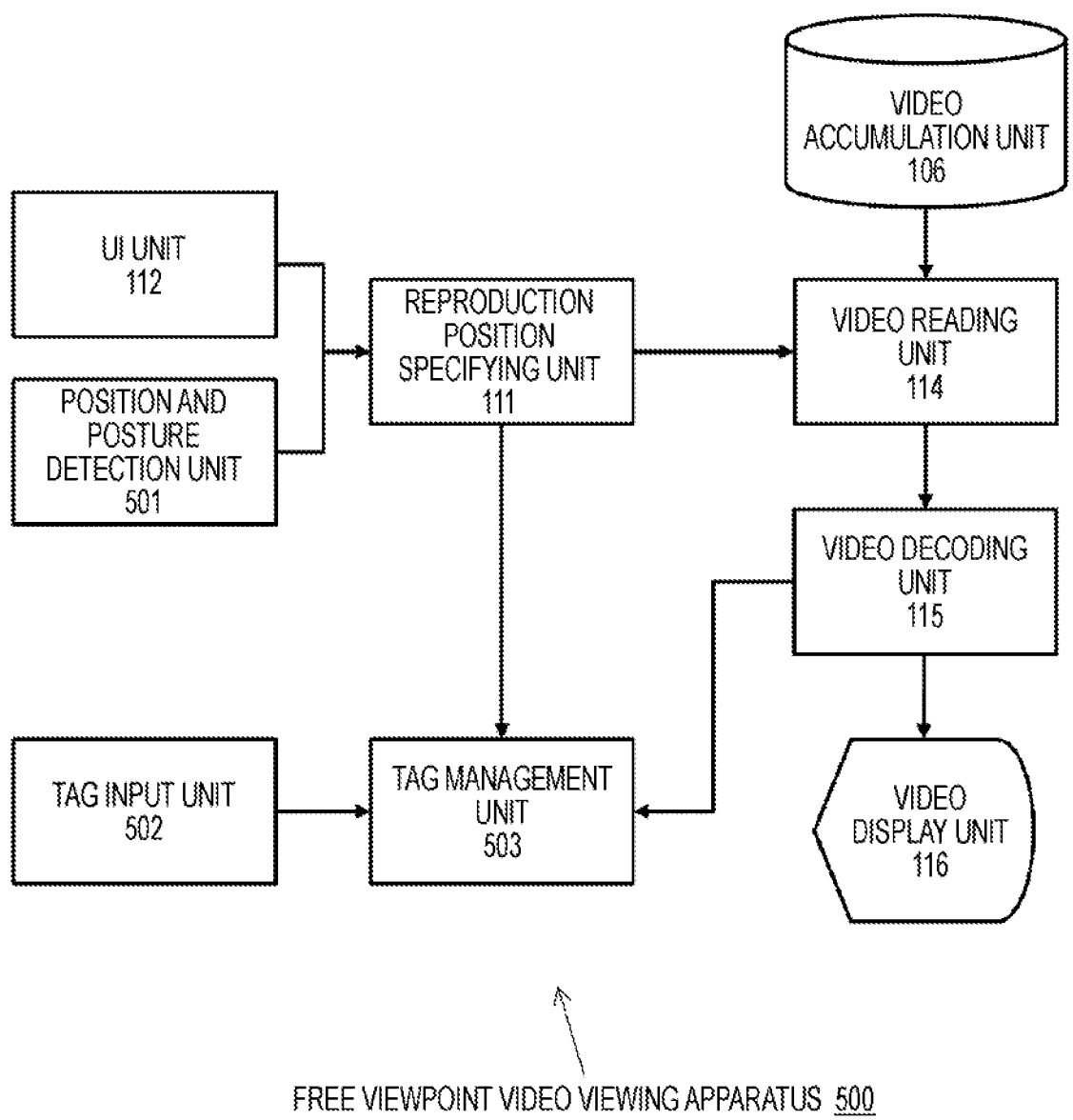
FIG. 5 is a diagram schematically illustrating a functional configuration example of a free viewpoint video viewing apparatus 500 having a tagging function.

FIG. 5 schematically illustrates a functional configuration example of a free viewpoint video viewing apparatus 500 having a tagging function. In the figure, it is assumed that the free viewpoint video viewing apparatus 500 is configured as a head-mounted display.

A position and posture detection unit 501 detects a viewpoint position and a viewing direction of a video viewed by the viewer. In a case of a head-mounted display, the position and posture detection unit 501 is configured as a head movement tracking device which detects the posture of the viewer's head.

On the basis of a detection result of the position and posture detection unit 501, the reproduction position specifying unit 111 specifies a viewpoint position and a viewing direction, and time of a video to be reproduced. Alternatively, the reproduction position specifying unit 111 specifies reproduction position information through an operation of the viewer or speech input of the viewer to the UI unit 112 (described above).

The video reading unit 114 reads a free viewpoint video corresponding to the viewpoint position and the viewing direction, and the time specified by the reproduction position specifying unit 111 from the video accumulation unit 106. Then, the video decoding unit 115 decodes the read video, and the video display unit 116 displays and outputs the decoded video.

A tag input unit 502 includes a device for inputting textual information such as a keyboard, a controller for a game machine, or a combination of a device for inputting speech such as a microphone and a speech recognition unit for converting an audio signal into textual information. While the viewer is viewing the free viewpoint video, the viewer can input textual information from the tag input unit 502 at an arbitrary timing.

A tag management unit 503 records the textual information input from the tag input unit 502 as a tag corresponding to the reproduction position information of the video additionally including the time.

FIG. 11 exemplifies a data structure for managing tags by the tag management unit 405 or 503. Each of the tags (textual information) input from the photographer or the viewer is stored in association with a viewpoint position and a viewing direction, and time of the free viewpoint video.

Note that in the present embodiment, it is assumed that each of the photographer and the viewer can tag the free viewpoint video freely (that is, without worrying about others). Therefore, it is also conceivable that the same viewpoint position and viewing direction, and time are tagged in an overlapping manner with tags including textual information different for each user, or that different viewpoint positions and viewing directions, and time are tagged with tags including the same textual information. In other words, the tag does not always uniquely identify the reproduction position of the free viewpoint video. For example, there are a case where a person A and a person B utter different words for the same reproduction position, and the person A's words and the person B's words are respectively recorded as tags, and a case where words uttered by the person A with respect to a P point and words uttered by the person B with respect to a Q point are accidentally the same and the person A's words and the person B's words are stored as tags indicating the points P and Q, respectively.

Figure 6:
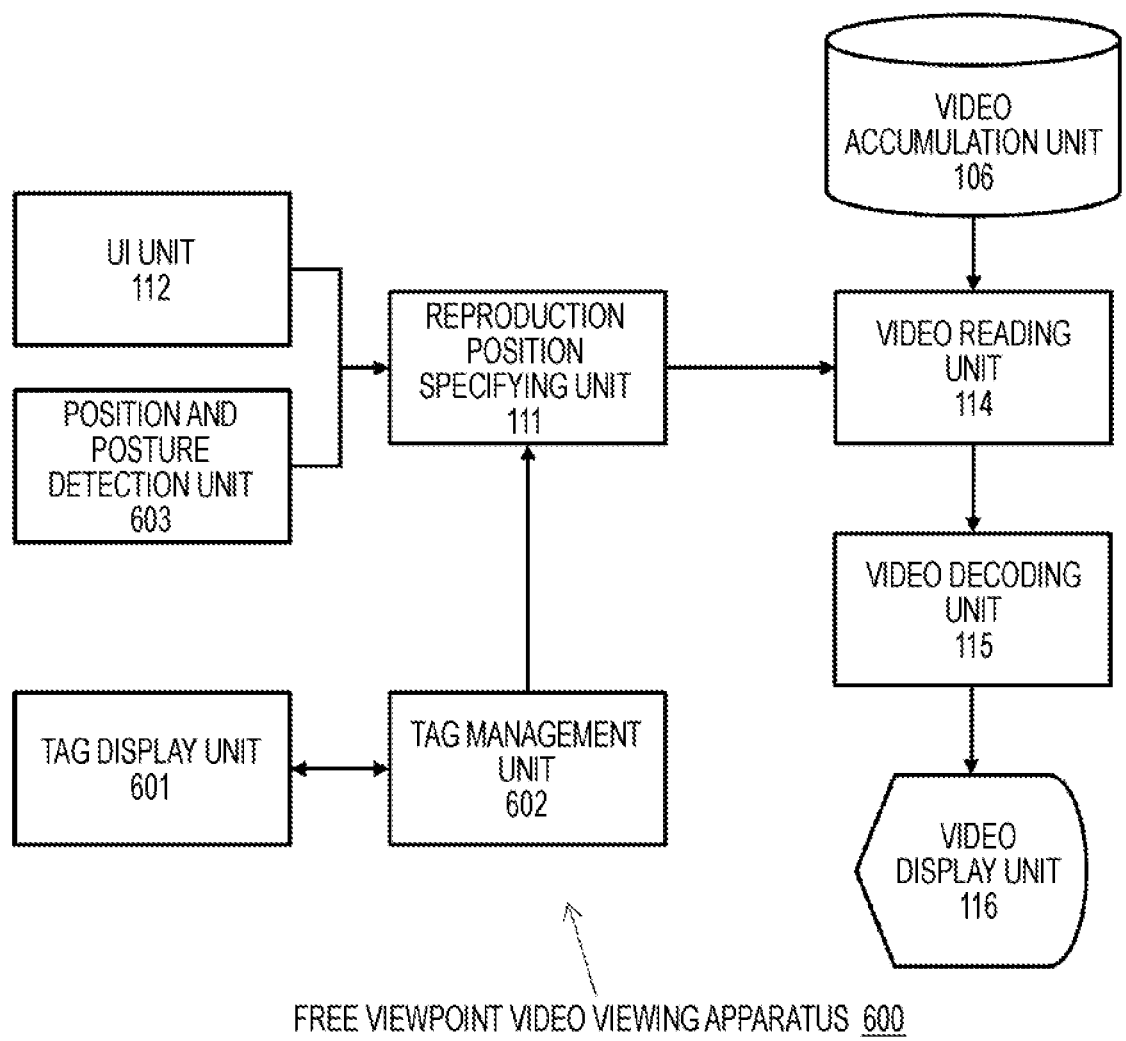
FIG. 6 is a diagram schematically illustrating a functional configuration example of a free viewpoint video viewing apparatus 600 which performs a cueing process using a tag.

In addition, FIG. 6 schematically illustrates a functional configuration example of a free viewpoint video viewing apparatus 600 which performs a cueing process of a video using a tag. In the figure, it is assumed that the free viewpoint video viewing apparatus 600 is configured as a head-mounted display.

A tag display unit 601 reads tags managed by a tag management unit 602 and displays textual information of each tag on a screen. As illustrated in FIG. 11, in the tag management unit 602, each of the tags (textual information) input from the photographer or the viewer is stored in association with the viewpoint position and the viewing direction, and the time of the free viewpoint video.

Tags are displayed in an arbitrary format on the tag display unit 601. The textual information constituting each tag may be displayed as a list in a time order or an alphabetical order, for example. Alternatively, the textual information may be displayed on a place corresponding to the viewpoint position on a map in a superimposed manner. Details of the tag display method will be given later. It is assumed that the viewer can select a desired tag (that is, a tag indicating a viewpoint position and a viewing direction, and time the viewer desires to view) on such a screen through a touch operation or a cursor operation.

The tag management unit 602 converts the tag selected on the tag display unit 601 into a viewpoint position and a viewing direction, and time corresponding thereto, and outputs the viewpoint position and the viewing direction, and the time to the reproduction position specifying unit 111.

On the basis of the input from the tag management unit 602, the reproduction position specifying unit 111 specifies the viewpoint position and the viewing direction of the video to be reproduced. Alternatively, the reproduction position specifying unit 111 may specify the reproduction position information on the basis of an operation of the viewer or speech input by the viewer to the UI unit 112, or a detection result of movement of the viewer's head by a position and posture detection unit 603.

The video reading unit 114 reads a free viewpoint video corresponding to the viewpoint position and the viewing direction specified by the reproduction position specifying unit 111 from the video accumulation unit 106. Then, the video decoding unit 115 decodes the read video, and the video display unit 116 displays and outputs the decoded video.

In this manner, by using textual information with which a free viewpoint video is tagged by the viewer himself/herself or another person, the viewer can specify a reproduction position of the free viewpoint video while having an image in advance with respect to the free viewpoint video. In addition, by using a tag including textual information, it is possible to cue a free viewpoint video which can be expected to be moving or sympathetic without performing a troublesome operation of specifying the numerical data which indicate the reproduction position such as the viewpoint position and the viewing direction, and the time.

Figure 7:
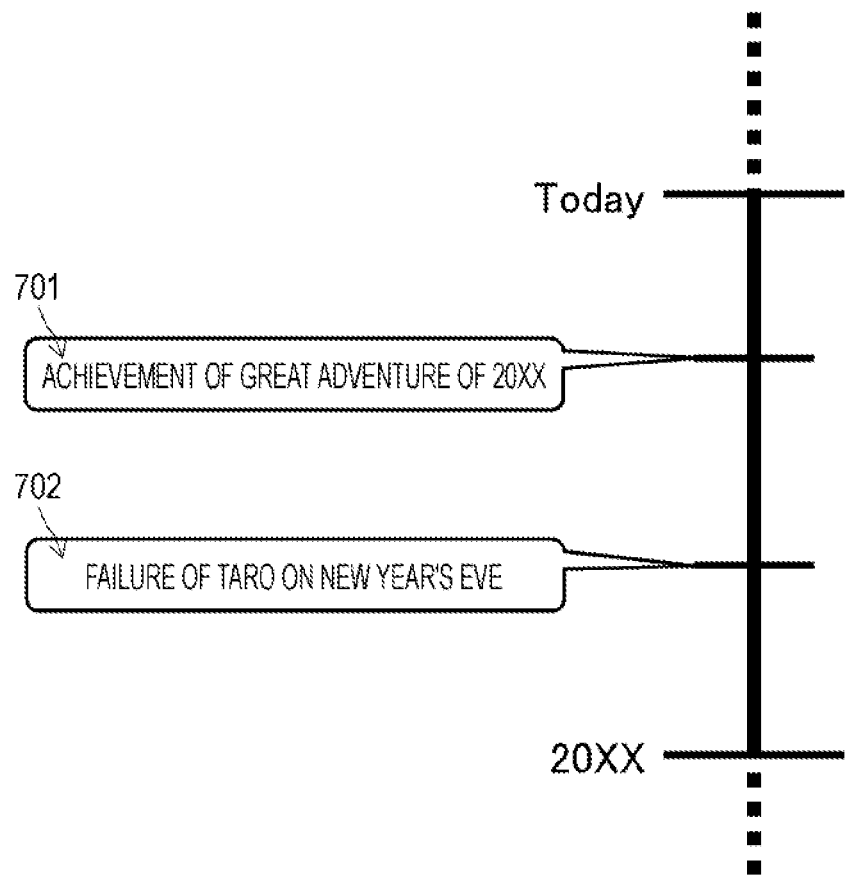
FIG. 7 is a diagram exemplifying a method for displaying tags in a time axis direction using a timeline.

The tag display unit 601 displays tags in an arbitrary format. FIG. 7 illustrates an example in which, as indicated by reference numerals 701 and 702, tags such as "achievement of great adventure of 20XX" and "failure of Taro on New Year's Eve" are displayed as timelines arranged on a time axis. According to the display method illustrated in the figure, it is possible to present the tags intended for a time axis direction in the reproduction position of the free viewpoint video. By selecting any one of the displayed tags, the viewer can relive the free viewpoint video from the reproduction position associated with the tag.

Figure 8:
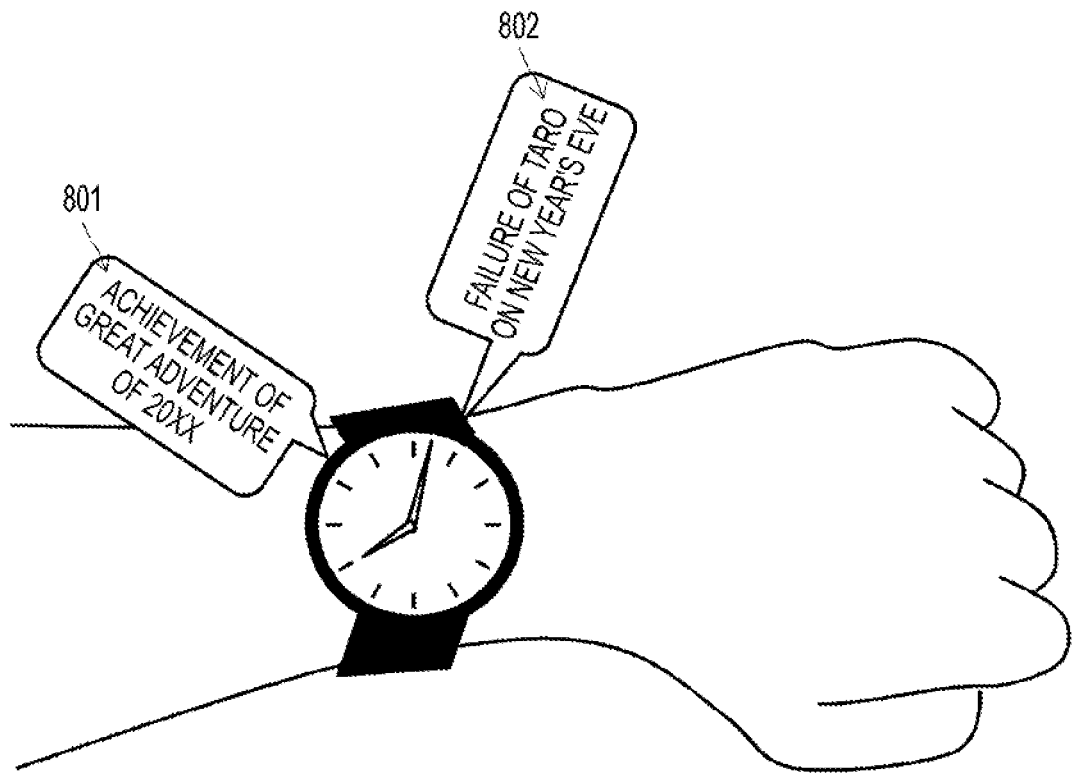
FIG. 8 is a view exemplifying a method for displaying tags in a time axis direction using a watch face.

In a case where the free viewpoint video viewing apparatus 600 is a see-through type head-mounted display, a tag as virtual information may be displayed on a scenery of the real world in a superimposed manner. FIG. 8 illustrates an example in which, as indicated by reference numerals 801 and 802, tags such as "achievement of great adventure of 20XX" and "failure of Taro on New Year's Eve" are displayed in a superimposed manner in accordance with graduations on a face of a wristwatch when the viewer sees the wristwatch. According to the display method illustrated in the figure, similarly to the example illustrated in FIG. 7, it is possible to present the tags intended for the time axis direction in the reproduction position of the free viewpoint video. By selecting any one of the displayed tags, the viewer can relive the free viewpoint video from the reproduction position associated with the tag.

Figure 9:
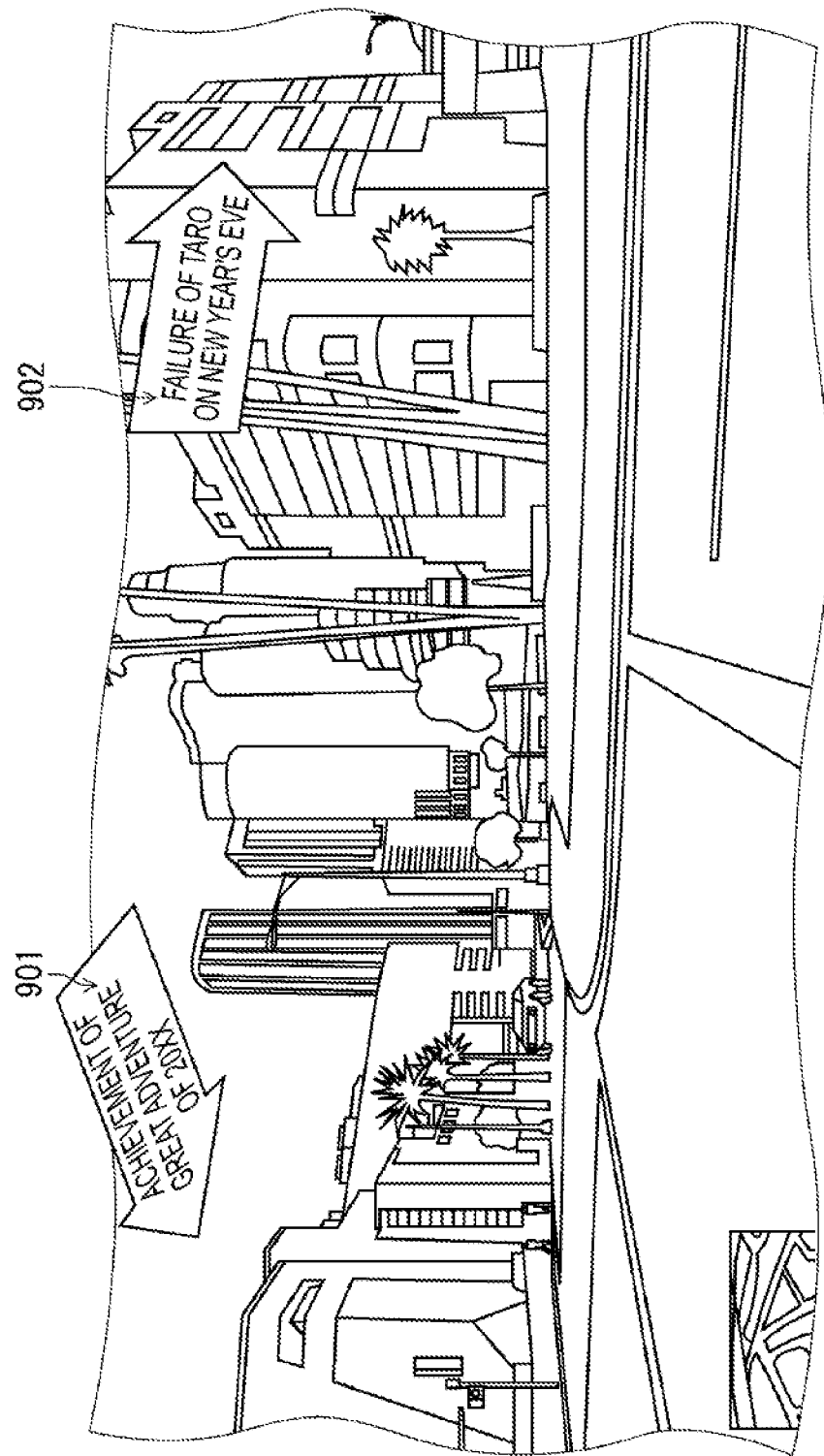
FIG. 9 is a view exemplifying a method for displaying tags in a spatial direction using a real scenery.

FIG. 9 illustrates an example in which, as indicated by reference numerals 901 and 902, tags such as "achievement of great adventure of 20XX" and "failure of Taro on New Year's Eve" are displayed in a superimposed manner on a street corner scenery the viewer is observing through the see-through type head-mounted display. According to the display method illustrated in the figure, it is possible to present the tags intended for a spatial direction in the reproduction position of the free viewpoint video. Each of the tags 901 and 902 is in a shape expressing the viewpoint position and the viewing direction of the free viewpoint video corresponding thereto. By selecting any one of the displayed tags, the viewer can relive the free viewpoint video from the reproduction position associated with the tag.

Figure 10:
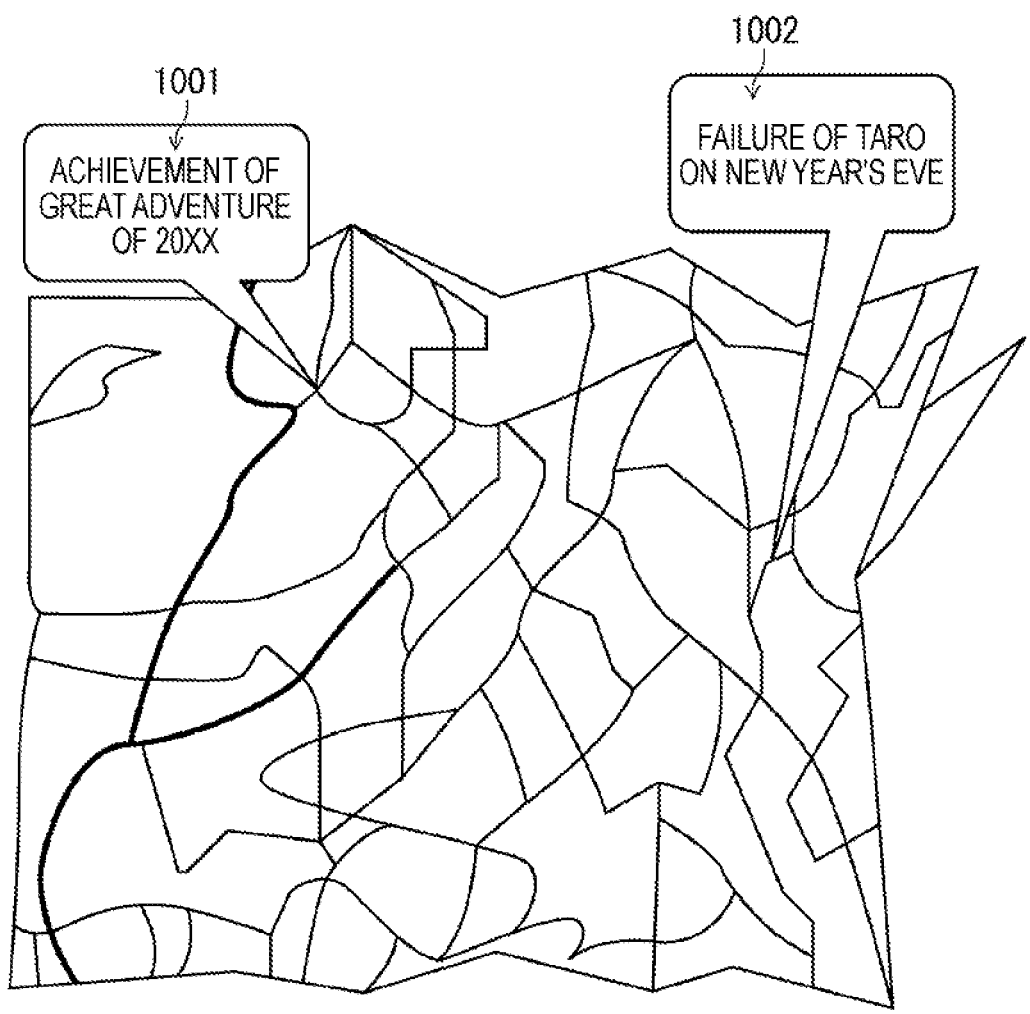
FIG. 10 is a view exemplifying a method for displaying tags in a spatial direction using a map.

FIG. 10 illustrates an example in which, as indicated by reference numerals 1001 and 1002, tags such as "achievement of great adventure of 20XX" and "failure of Taro on New Year's Eve" are displayed in a superimposed manner on a map (or a map-like UI spread in a virtual space). According to the display method illustrated in the figure, similarly to the example illustrated in FIG. 9, it is possible to present the tags intended for the spatial direction in the reproduction position of the free viewpoint video. Each of the tags 1001 and 1002 is in a shape expressing the viewpoint position and the viewing direction of the free viewpoint video corresponding thereto. By selecting any one of the displayed tags, the viewer can relive the free viewpoint video from the reproduction position associated with the tag.

As can be seen from FIGS. 7 to 10, according to the technology disclosed in the present description, by using tags including textual information when reliving the free viewpoint video, the viewer can more easily understand which experience the reproduction position indicated by each of the tags is corresponding to. The textual information included in the tag can also be said to be a "name" given to the reproduction position associated with the tag.

FIG. 11 exemplifies a data structure in which each of the tags (textual information) input by the photographer or the viewer is stored in association with the viewpoint position and the viewing direction, and the time of the free viewpoint video. In the tag management unit, furthermore, other additional information may be stored in association with the tags.

For example, in the case of a system configuration in which tagging is performed at the time of shooting as illustrated in FIG. 4, shooting conditions at the time of shooting, filming conditions at the time of filming, and furthermore, credit information may be stored as additional information in association with each tag.

The shooting conditions may include, for example, the weather at a time of shooting (weather, temperature, humidity, wind, precipitation amount, etc.), parameters of a camera used for shooting (exposure conditions, depth of focus, etc.). In addition, the filming conditions may include filming date and time, a filming site, and routine use of instruments used for filming. In addition, the credit information may include a director, a producer, and other staff involved in creation of the content, sponsor information, links to related information (such as URL), and premium content. These pieces of additional information can be used for performing search or filtering on the basis of tags.

Figure 12:
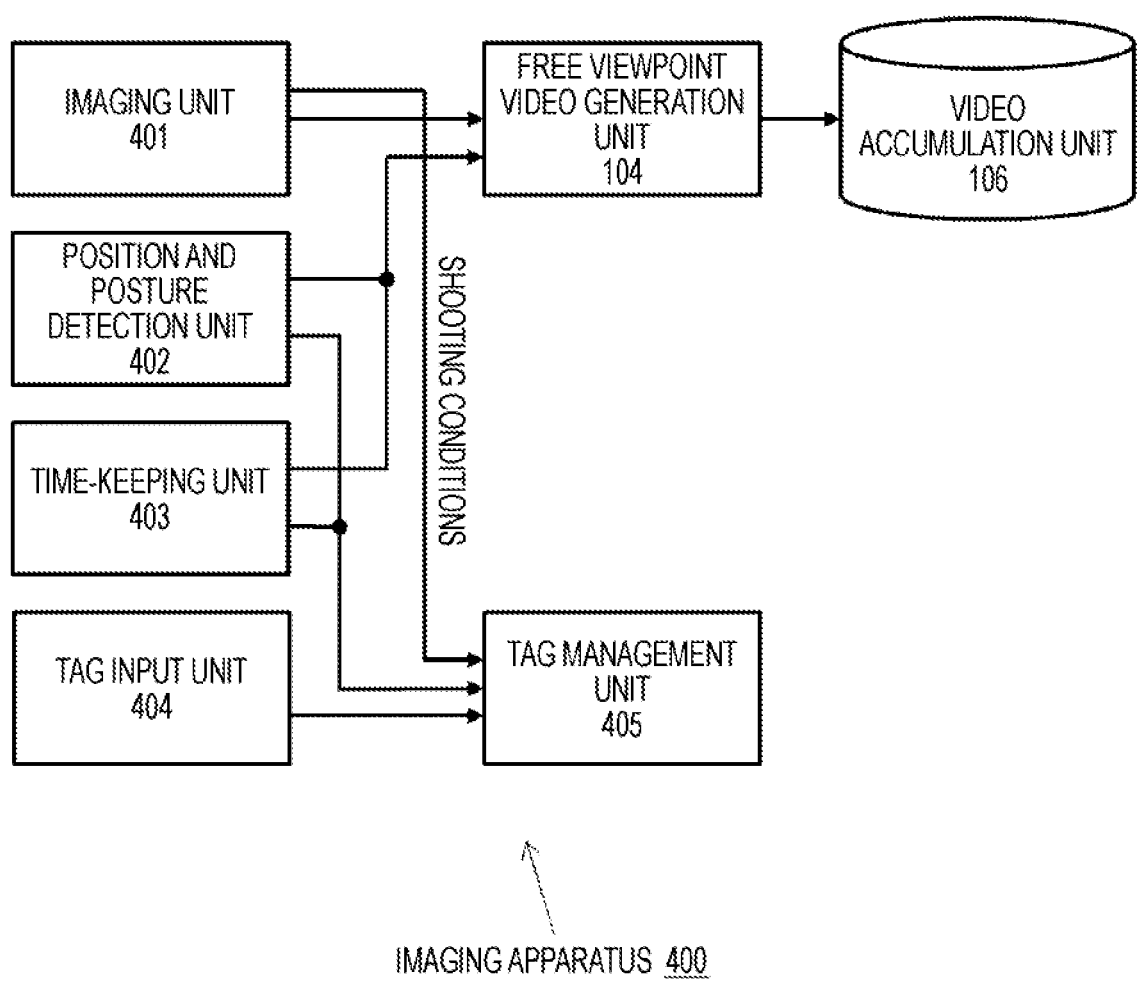
FIG. 12 is a diagram illustrating a variation of the imaging apparatus 400 configured to store shooting conditions together with reproduction position information in association with each tag.

FIG. 12 illustrates a variation of the imaging apparatus 400 configured to store the shooting conditions together with the reproduction position information in association with each tag. When inputting, from the position and posture detection unit 402, the viewpoint position and the viewing direction of the imaging unit 401 at the time the textual information is input from the tag input unit 404, and inputting the shooting time from the time-keeping unit 403, the tag management unit 405 records the textual information as a tag corresponding to the reproduction position information including the viewpoint position and the viewing direction, and the shooting time. Furthermore, the tag management unit 405 inputs the shooting conditions from the imaging unit 401 at the time the tag is input, and stores the tag in association with the reproduction position information and the shooting conditions as illustrated in FIG. 13.

In addition, user information of the photographer or the viewer who performs tagging may be stored as additional information in association with each tag.

The user information may include the emotion (emotional levels of delight, anger, sorrow, and pleasure/continuous values) of the viewer at the time of tagging, biological information such as sweating/heart rate and fever/respiration, and identification information capable of identifying the viewer himself/herself. These pieces of user information can be used for performing search or filtering on the basis of tags. In addition, the pieces of user information may be, not used directly, but handled as respective parameters of a multivariate analysis later.

Figure 14:
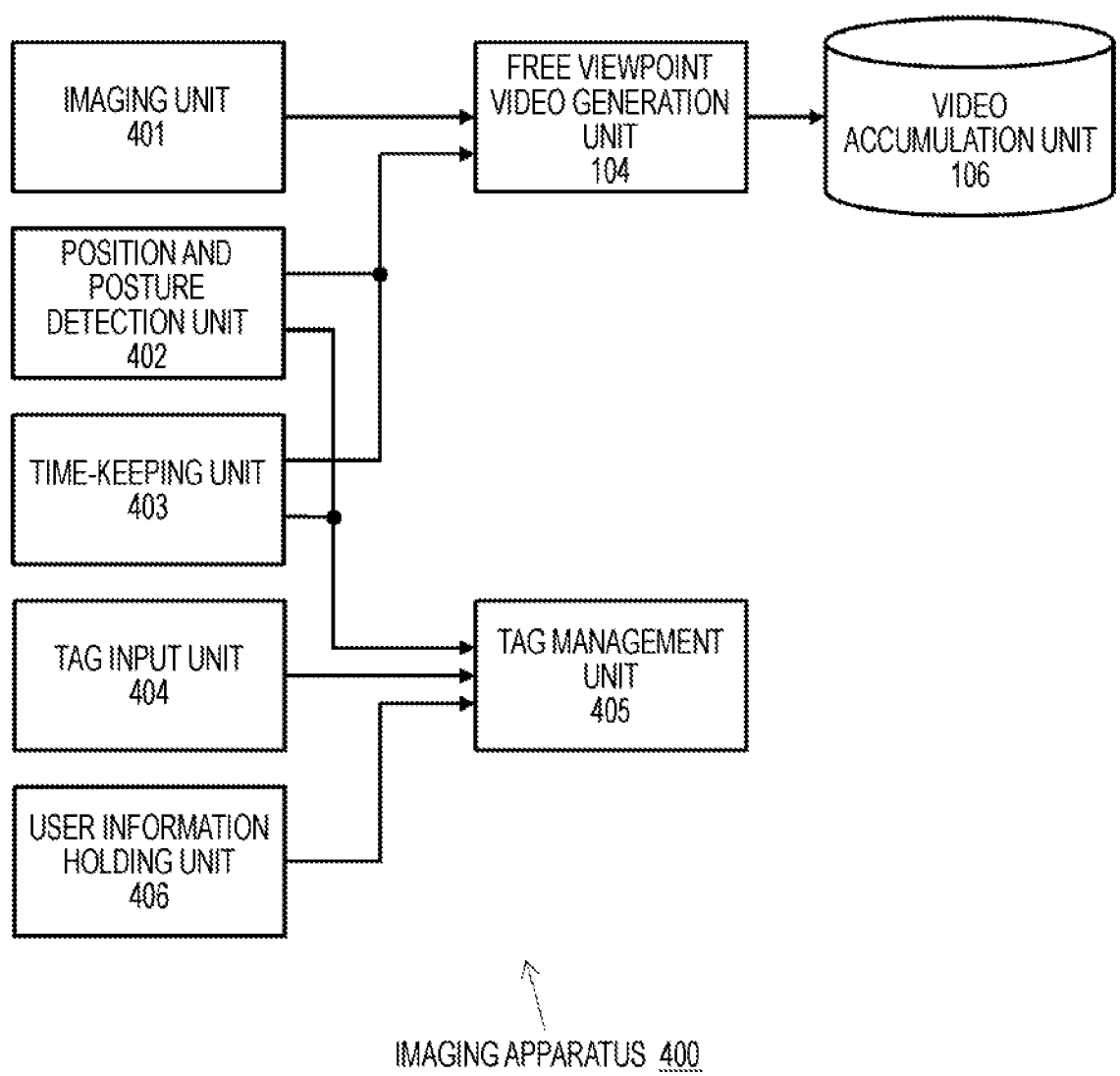
FIG. 14 is a diagram illustrating a variation of the imaging apparatus 400 configured to store user information together with the reproduction position information in association with each tag.

FIG. 14 illustrates a variation of the imaging apparatus 400 configured to store the user information together with the reproduction position information in association with each tag. The imaging apparatus 400 further includes a user information holding unit 406 which holds user information regarding the photographer. The user information holding unit 406 is constituted by a sensor which detects biological information of the photographer, a memory which stores personal information such as identification information of the photographer, and the like. When inputting, from the position and posture detection unit 402, the viewpoint position and the viewing direction of the imaging unit 401 at the time the textual information is input from the tag input unit 404, and inputting the shooting time from the time-keeping unit 403, the tag management unit 405 records the textual information as a tag corresponding to the reproduction position information including the viewpoint position and the viewing direction, and the shooting time. Furthermore, the tag management unit 405 inputs, from the user information holding unit 406, the user information at the time the tag is input, and stores the tag in association with the reproduction position information and the user information, as illustrated in FIG. 16.

Figure 15:
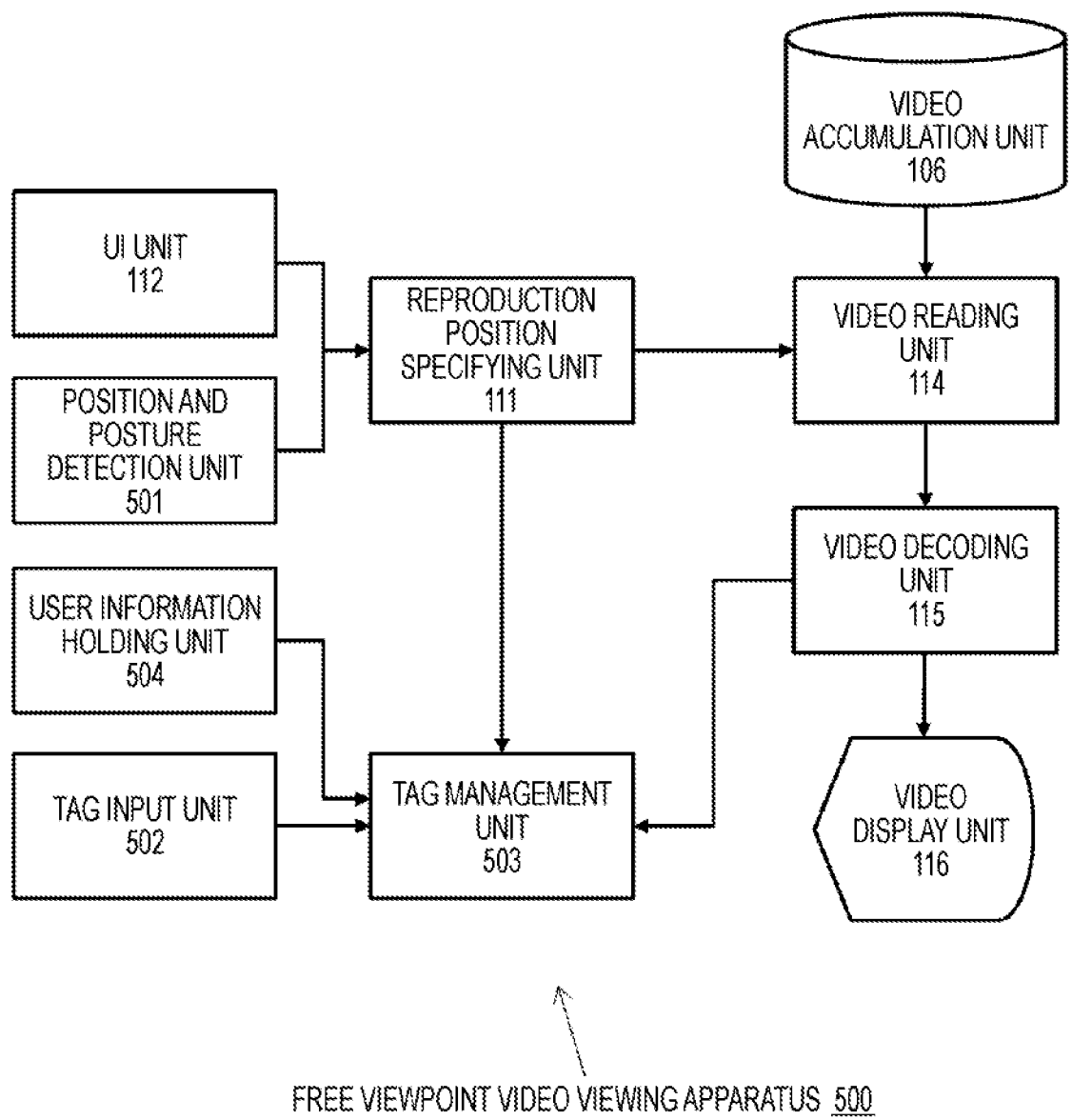
FIG. 15 is a diagram illustrating a variation of the free viewpoint video viewing apparatus 500 configured to store the user information together with the reproduction position information in association with each tag.

In addition, FIG. 15 illustrates a variation of the free viewpoint video viewing apparatus 500 configured to store the user information together with the reproduction position information in association with each tag. The free viewpoint video viewing apparatus 500 further includes a user information holding unit 504 which holds user information regarding the viewer. The user information holding unit 504 is constituted by a sensor which detects biological information of the photographer, a memory which stores personal information such as identification information of the photographer, and the like. When inputting, from the reproduction position specifying unit 111, the viewpoint position and the viewing direction of the free viewpoint video being viewed at the time the textual information is input from the tag input unit 502, the tag management unit 503 records the textual information as a tag corresponding to the reproduction position information. Furthermore, the tag management unit 503 inputs, from the user information holding unit 504, the user information at the time the tag is input, and stores the tag in association with the reproduction position information and the user information, as illustrated in FIG. 16.

FIG. 6 illustrates a functional configuration example of the free viewpoint video viewing apparatus 600 which performs a cueing process using a tag. As illustrated in FIGS. 13 and 16, in a case where the shooting conditions and the user information are associated with the tags, the video reading unit 114 can perform filtering of the free viewpoint video by using not only the reproduction position information such as the viewpoint position and the viewing direction, and the time, but also the shooting conditions and the user information. For example, in a case where a plurality of free viewpoint videos having the same reproduction position is accumulated in the video accumulation unit 106, the video reading unit 114 may select and read a video with better shooting conditions or a video closer to a viewing environment of the viewer. In addition, in a case where a plurality of free viewpoint videos having the same reproduction position is accumulated in the video accumulation unit 106, the video reading unit 114 may select and read a video associated with user information close to the current viewer (or user information having a predetermined correlation with the current viewer).

Figure 17:
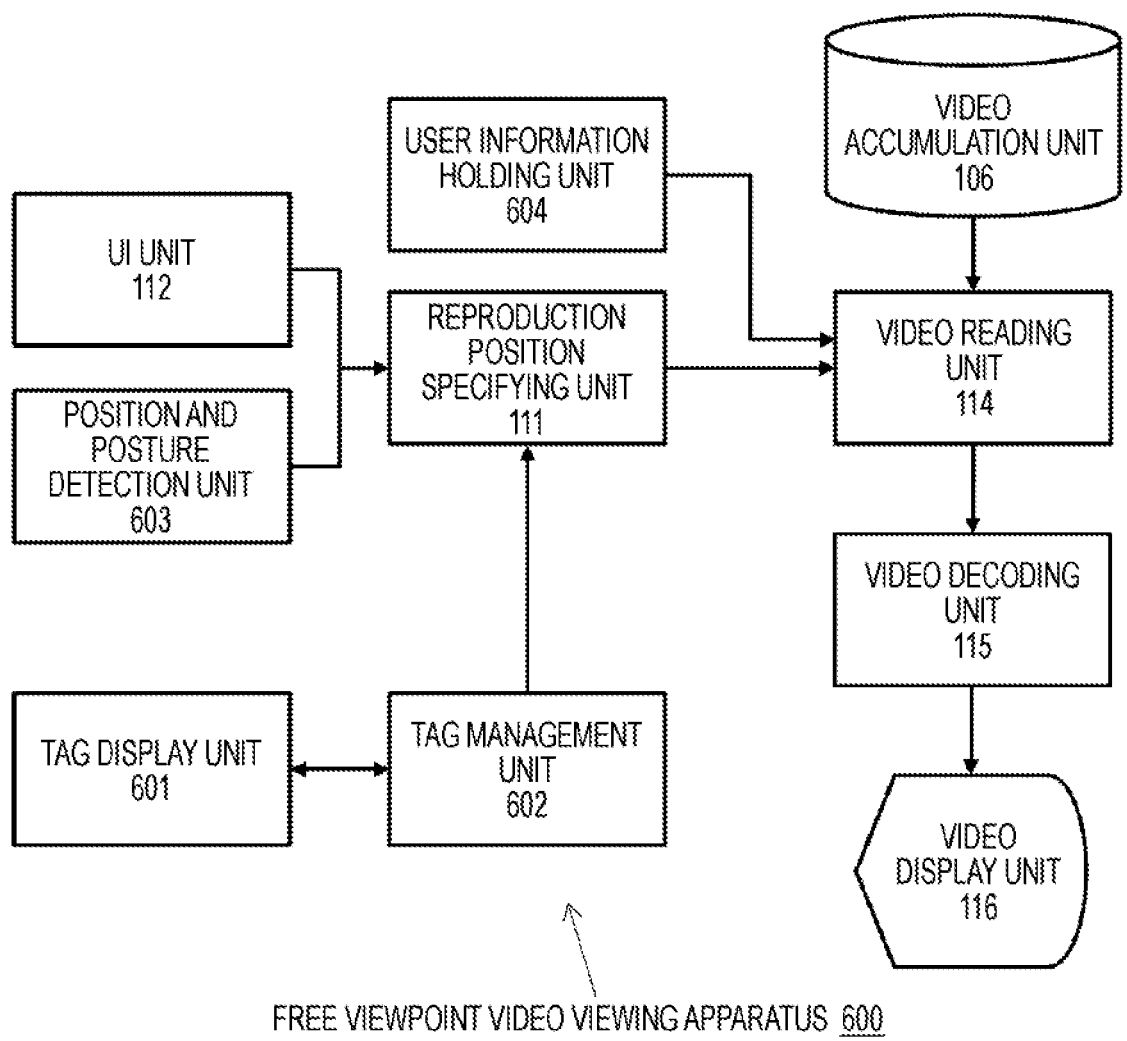
FIG. 17 is a diagram illustrating a variation of the free viewpoint video viewing apparatus 600 configured to perform filtering of a video in consideration of the user information together with the reproduction position information.

FIG. 17 illustrates a variation of the free viewpoint video viewing apparatus 600 configured to perform filtering of a video in consideration of the user information together with the reproduction position information. The video reading unit 114 reads a free viewpoint video corresponding to the viewpoint position and the viewing direction specified by the reproduction position specifying unit 111 from the video accumulation unit 106. At that time, the user information of the viewer is input from a user information holding unit 604, and a video associated with user information close to the current viewer (or user information having a predetermined correlation with the current viewer) is selected and read from the video accumulation unit 106.

INDUSTRIAL APPLICABILITY

Hereinbefore, the technology disclosed in the present description has been described in detail with reference to the specific embodiments. However, it is obvious that those skilled in the art can make modifications and substitutions of the embodiments without departing from the gist of the technology disclosed in the present description.

The technology disclosed in the present description can be applied to a multi-view camera for shooting a free viewpoint video and various display devices for viewing free viewpoint videos.

In short, the technology disclosed in the present description has been described in a form of exemplification, and the contents of the present description should not be interpreted restrictively. In order to judge the gist of the technology disclosed in the present description, the claims should be taken into consideration.

Note that the technology disclosed in the present description may have the following configurations.

(1) An information management apparatus including:
a reproduction position specifying unit which specifies a reproduction position of a free viewpoint video including at least a viewpoint position and a viewing direction, and time information;
a tag input unit which inputs a tag including textual information with respect to the specified reproduction position; and
a tag management unit which manages the input tag in association with the specified reproduction position.

(2) The information management apparatus according to (1) above,
in which the reproduction position specifying unit specifies the reproduction position of the free viewpoint video on the basis of a viewpoint position and a viewing direction of a camera which shoots the free viewpoint video and shooting time.

(3) The information management apparatus according to (1) above,
in which the reproduction position specifying unit specifies a reproduction position at a time the tag is input from the tag input unit while the free viewpoint video is being viewed.

(4) The information management apparatus according to (1) above, further including:
a head movement tracking unit which tracks movement of the head of a viewer; and
a display unit which displays the free viewpoint video while changing the viewpoint position and the viewing direction depending on a detection result by the head movement tracking unit, in which
the reproduction position specifying unit specifies a reproduction position based on a detection result by the head movement tracking unit at a time the tag is input from the tag input unit while the free viewpoint video is being viewed.

(5) The information management apparatus according to (1) above,
in which the tag input unit inputs the tag including textual information based on an input operation by a photographer or a viewer of the free viewpoint video.

(6) The information management apparatus according to (1) above,
in which the tag input unit inputs the tag including textual information based on a recognition result of a speech input from a photographer or a viewer of the free viewpoint video.

(7) The information management apparatus according to (1) above,
in which the tag management unit manages the tag in further association with shooting conditions for shooting the free viewpoint video.

(8) The information management apparatus according to (1) above,
in which the tag management unit manages the tag in further association with user information regarding a photographer or a viewer of the free viewpoint video.

(9) An information management method including: a reproduction position specifying step of specifying a reproduction position of a free viewpoint video including at least a viewpoint position and a viewing direction, and time information;
a tag input step of inputting a tag including textual information with respect to the specified reproduction position; and
a tag management step of managing the input tag in association with the specified reproduction position.

(10) A video reproduction apparatus including:
a tag management unit which manages tags including textual information each associated with a reproduction position of a free viewpoint video including at least a viewpoint position and a viewing direction, and time information;
a tag display unit which displays the tags managed by the tag management unit;
a reproduction position specifying unit which specifies a reproduction position corresponding to a tag selected through the tag display unit; and
an output unit which reproduces and outputs the free viewpoint video from the reproduction position specified by the reproduction position specifying unit.

(11) The video reproduction apparatus according to (10) above,
in which the tag display unit displays the tag arranged on the basis of the time information associated therewith.

(12) The video reproduction apparatus according to (10) above, in which the tag display unit includes a see-through type screen, and displays the tag as virtual information on a scenery of the real world in a superimposed manner.

(13) The video reproduction apparatus according to (12) above, in which the tag display unit displays the tag on the scenery of the real world in a superimposed manner on the basis of the viewpoint position or the viewing direction associated therewith.

(14) The video reproduction apparatus according to (10) above, further including an additional information holding unit which holds additional information, in which the output unit reproduces and outputs the free viewpoint video in consideration of the additional information.

(15) The video reproduction apparatus according to (14) above, in which the additional information holding unit holds user information regarding a viewer of the free viewpoint video as the additional information, and the output unit reproduces and outputs the free viewpoint video in consideration of the user information.

(16) A video reproduction method including:

a tag management step of managing, by a tag management unit, tags including textual information each associated with a reproduction position of a free viewpoint video including at least a viewpoint position and a viewing direction, and time information;

a tag display step of displaying the tags managed by the tag management unit on a tag display unit;

a reproduction position specifying step of specifying a reproduction position corresponding to a tag selected through the tag display unit; and an output step of reproducing and outputting the free viewpoint video from the reproduction position specified in the reproduction position specifying step.

REFERENCE SIGNS LIST

100 Free viewpoint video viewing system
101-1, 101-2, . . . , 101-N Camera
102 Communication interface
103 Video input unit
104 Free viewpoint video generation unit
105 Video encoding unit
106 Video accumulation unit
111 Reproduction position specifying unit
112 User interface (UI) unit
113 Head movement tracking unit
114 Video reading unit
115 Video decoding unit
116 Video display unit
201 Free viewpoint video providing apparatus
202 Free viewpoint video viewing apparatus
301 Free viewpoint video production apparatus
302 Video server
303 Free viewpoint video viewing apparatus
400 Imaging apparatus
401 Imaging unit
402 Position and posture detection unit
403 Time-keeping unit
404 Tag input unit
405 Tag management unit
406 User information holding unit
500 Free viewpoint video viewing apparatus
501 Position and posture detection unit
502 Tag input unit
503 Tag management unit
504 User information holding unit
600 Free viewpoint video viewing apparatus
601 Tag display unit
602 Tag management unit
603 Position and posture detection unit
604 User information holding unit

The invention claimed is:

1. An information management apparatus comprising:
a reproduction position specifying unit that specifies a reproduction position of a free viewpoint video including at least a viewpoint position, a viewing direction, and a shooting time providing information about a time at which the free viewpoint video was taken;
a tag input unit that inputs one or more tags including textual information about the specified reproduction position and textual information corresponding to recognized speech of words uttered when the free viewpoint video was shot, a tag including textual information corresponding to the recognized speech being associated with one or more of the viewpoint position, the viewing direction, and the shooting time; and
a tag management unit that manages the one or more tags in association the specified reproduction position.

2. The information management apparatus according to claim 1, wherein the reproduction position specifying unit specifies the reproduction position of the free viewpoint video on the basis of the viewpoint position and the viewing direction of a camera that shoots the free viewpoint video.

3. The information management apparatus according to claim 1, wherein the reproduction position specifying unit specifies a reproduction position at a time the one or more tags are input from the tag input unit while the free viewpoint video is being viewed.

4. The information management apparatus according to claim 1, further comprising:
a head movement tracking unit that tracks movement of a viewer's head; and
a display unit that displays the free viewpoint video while changing the viewpoint position and the viewing direction depending on a detection result by the head movement tracking unit, wherein
the reproduction position specifying unit specifies a reproduction position based on a detection result by the head movement tracking unit at a time the one or more tags are input from the tag input unit while the free viewpoint video is being viewed.

5. The information management apparatus according to claim 1, wherein the tag input unit inputs the one or more tags including textual information based on an input operation by a photographer or a viewer of the free viewpoint video.

6. The information management apparatus according to claim 1, wherein the one or more tags including textual information corresponding to speech recognition of words comprise words from a photographer or a viewer of the free viewpoint video.

7. The information management apparatus according to claim 1, wherein the tag management unit manages the one or more tags in further association with shooting conditions for shooting the free viewpoint video.

8. The information management apparatus according to claim 1, wherein the tag management unit manages the one or more tags in further associating with user information regarding a photographer or a viewer of the free viewpoint video.

9. An information management method comprising:
specifying a reproduction position of a free viewpoint video including at least a viewpoint position and a viewing direction, and a shooting time providing information about a time at which the free viewpoint video was taken;
receiving one or more input tags including textual information about the specified reproduction position and textual information corresponding to recognized speech of words uttered when the free viewpoint video was shot, a tag including textual information corresponding to the recognized speech being associated with one or more of the viewpoint position, the viewing direction, and the shooting time; and
managing the one or more input tags in association with the specified reproduction position.

10. A video reproduction apparatus comprising:
a tag management unit that manages tags including textual information each associated with a reproduction position of a free viewpoint video including a least a viewpoint position and a viewing direction, a shooting time providing information about a time at which the free viewpoint video was taken, and textual information corresponding to recognized speech of words uttered when the free viewpoint video was shot, a tag including textual information corresponding to the recognized speech being associated with one or more of the viewpoint position, the viewing direction, and the shooting time;
a tag display unit that displays the tags managed by the tag management unit;
a reproduction position specifying unit that specifies a reproduction position corresponding to a tag selected through the tag display unit; and
an output unit that reproduces and outputs the free viewpoint video from the reproduction position specified by the reproduction position specifying unit.

11. The video reproduction apparatus according to claim 10, wherein the tag display unit displays the tags arranged on the basis of the time information associated therewith.

12. The video reproduction apparatus according to claim 10, wherein the tag display unit comprises a see-through type screen, and displays the tags as virtual information on a scenery of the real world in a superimposed manner.

13. The video reproduction apparatus according to claim 12, wherein the tag display unit displays the tags on the real world scenery in a superimposed manner based on the viewpoint position or the viewing direction associated therewith.

14. The video reproduction apparatus according to claim 10, further comprising an additional information holding unit that holds additional information, wherein the output unit reproduces and outputs the free viewpoint video in consideration of the additional information.

15. The video reproduction apparatus according to claim 14, wherein the additional information holding unit holds user information regarding a viewer of the free viewpoint video as the additional information, and
the output unit reproduces and outputs the free viewpoint video in consideration of the user information.

16. A video reproduction method comprising:
managing, by a tag management unit, tags including textual information each associated with a reproduction position of a free viewpoint video including at least a viewpoint position and a viewing direction, a shooting time providing information about a time at which the free viewpoint video was taken, and textual information corresponding to speech recognition of words uttered when the free viewpoint video was shot, a tag including textual information corresponding to the recognized speech being associated with one or more of the viewpoint position, the viewing direction, and the shooting time;
displaying the tags managed by the tag management unit on a tag display unit;
specifying a reproduction position corresponding to a tag selected through the tag display unit; and
outputting the free viewpoint video from the reproduction position specified in the reproduction position specifying step.

* * * * *